US008539186B2

(12) United States Patent
Sechrest et al.

(10) Patent No.: US 8,539,186 B2
(45) Date of Patent: Sep. 17, 2013

(54) METHODS AND MECHANISMS FOR PROACTIVE MEMORY MANAGEMENT

(75) Inventors: Stuart Sechrest, Redmond, WA (US); Michael R. Fortin, Redmond, WA (US); Mehmet Iyigun, Redmond, WA (US); Cenk Ergan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 12/759,536

(22) Filed: Apr. 13, 2010

(65) Prior Publication Data

US 2010/0199043 A1     Aug. 5, 2010

Related U.S. Application Data

(62) Division of application No. 10/325,591, filed on Dec. 20, 2002, now Pat. No. 6,910,106.

(60) Provisional application No. 60/416,115, filed on Oct. 4, 2002.

(51) Int. Cl.
*G06F 12/00* (2006.01)
*G06F 13/00* (2006.01)

(52) U.S. Cl.
USPC ............ 711/165; 711/100; 711/154; 711/158

(58) Field of Classification Search
USPC ................................. 711/100, 154, 158, 165
See application file for complete search history.

(56) References Cited

U.S. PATENT DOCUMENTS

| | | | |
|---|---|---|---|
| 5,175,834 A | 12/1992 | Sawai | |
| 5,263,136 A * | 11/1993 | DeAguiar et al. | 345/538 |
| 5,717,954 A * | 2/1998 | Grieff et al. | 710/57 |
| 5,809,280 A * | 9/1998 | Chard et al. | 711/160 |
| 5,897,660 A | 4/1999 | Reinders | |
| 6,185,629 B1 | 2/2001 | Simpson | |
| 6,237,065 B1 | 5/2001 | Banerjia | |
| 6,272,534 B1 | 8/2001 | Guha | |
| 6,317,806 B1 | 11/2001 | Audityan | |
| 6,366,996 B1 | 4/2002 | Hobson | |
| 6,378,043 B1 | 4/2002 | Girkar | |
| 6,408,058 B1 | 6/2002 | Lanet | |
| 6,418,510 B1 | 7/2002 | Lamberts | |
| 6,425,057 B1 | 7/2002 | Cherkasova | |

(Continued)

OTHER PUBLICATIONS

U.S. Appl. No. 12/759,526, filed Apr. 13, 2010, Sechrest.

(Continued)

*Primary Examiner* — Tuan Thai
(74) *Attorney, Agent, or Firm* — Workman Nydegger

(57) ABSTRACT

A proactive, resilient and self-tuning memory management system and method that result in actual and perceived performance improvements in memory management, by loading and maintaining data that is likely to be needed into memory, before the data is actually needed. The system includes mechanisms directed towards historical memory usage monitoring, memory usage analysis, refreshing memory with highly-valued (e.g., highly utilized) pages, I/O pre-fetching efficiency, and aggressive disk management. Based on the memory usage information, pages are prioritized with relative values, and mechanisms work to pre-fetch and/or maintain the more valuable pages in memory. Pages are pre-fetched and maintained in a prioritized standby page set that includes a number of subsets, by which more valuable pages remain in memory over less valuable pages. Valuable data that is paged out may be automatically brought back, in a resilient manner. Benefits include significantly reducing or even eliminating disk I/O due to memory page faults.

20 Claims, 6 Drawing Sheets

(56) References Cited

U.S. PATENT DOCUMENTS

| | | |
|---|---|---|
| 6,546,472 B2 * | 4/2003 | Atkinson et al. ............ 711/156 |
| 6,651,141 B2 | 11/2003 | Adrangi |
| 6,742,097 B2 | 5/2004 | Woo |
| 6,782,453 B2 | 8/2004 | Keitcher |
| 6,877,081 B2 | 4/2005 | Herger |
| 6,879,266 B1 | 4/2005 | Dye |
| 6,910,106 B2 | 6/2005 | Sechrest |
| 6,938,116 B2 | 8/2005 | Kim |
| 6,959,318 B1 | 10/2005 | Tso |
| 7,007,072 B1 | 2/2006 | Guha |
| 7,185,155 B2 | 2/2007 | Sechrest |
| 2002/0087797 A1 | 7/2002 | Adrangi |
| 2002/0178326 A1 | 11/2002 | Ohta |
| 2002/0199075 A1 | 12/2002 | Jacobs |
| 2003/0009538 A1 | 1/2003 | Shah et al. |
| 2003/0110357 A1 | 6/2003 | Nguyen |
| 2005/0235119 A1 | 10/2005 | Sechrest |

OTHER PUBLICATIONS

U.S. Appl. No. 11/150,728, mailed Feb. 2, 2006, Office Action.
U.S. Appl. No. 11/150,728, mailed Jul. 17, 2006, Office Action.
U.S. Appl. No. 11/150,728, mailed Dec. 5, 2006, Notice of Allowance.
U.S. Appl. No. 11/150,686, mailed Apr. 16, 2009, Office Action.
U.S. Appl. No. 11/150,686, mailed Jan. 27, 2010, Notice of Allowance.
Office Action dated Feb. 16, 2011 cited in U.S. Appl. No. 12/759,526.
Notice of Allowance dated Jul. 11, 2011 cited in U.S. Appl. No. 12/759,526.

* cited by examiner

METHODS AND MECHANISMS FOR PROACTIVE MEMORY MANAGEMENT

CROSS-REFERENCE TO RELATED APPLICATION

This application claims priority to, the benefit of, and is a divisional application of U.S. Pat. No. 6,910,106, filed Dec. 20, 2002, entitled "METHODS AND MECHANISMS FOR PROACTIVE MEMORY MANAGEMENT", which claims priority to U.S. Provisional Patent Application Ser. No. 60/416,115, filed Oct. 4, 2002, entitled "METHODS AND MECHANISMS FOR PROACTIVE MEMORY MANAGEMENT". All of the above applications are incorporated herein by reference in their entireties.

FIELD OF THE INVENTION

The invention relates generally to the management of computer memory.

BACKGROUND OF THE INVENTION

Contemporary computing systems are equipped with significant amounts of random access memory, or RAM, presently on the order of 256 megabytes to a couple of gigabytes. However, current memory management mechanisms and methods were designed many years ago, when RAM was a relatively scarce computing resource. To provide large amounts of virtual memory to program processes, such memory management mechanisms relied on techniques such as on demand paging, essentially transferring pages of data from RAM to a disk drive when some quantity of RAM space was needed by another process, and, if that transferred data was ever again needed by its corresponding process, reading the data back from disk to RAM.

With such conventional memory management, needed pages are often absent from memory, even though the total amount of code and data that is referenced in typical usage patterns is fairly consistent over time and is small relative to current memory sizes. This is a primarily a result of two factors, namely that the system undergoes transitions that can force needed pages from memory and/or quickly change the set of pages needed, and erosion, in which pages not in active use are overwritten with other data.

Examples of such transitions include booting from a powered-off state, switching from one user to another, resuming from a standby or hibernate mode, using a memory-hungry application (e.g., playing a game) and then proceeding back to typical system use, and returning to the computer after a long delay. Needless to say, in addition to fast normal operation, customers highly desire fast system and program startup following such transitions. However, with current memory management this is not presently possible. For example, tests have shown that following a resume from hibernate, an application launch can take as long as nine to eleven seconds, even though large amounts of memory are unused at this time. This is because most of the launch time is consumed in disk transfers, with the CPU blocked, waiting for the necessary code and data pages to be read from the disk, which as a result of demand paging is essentially performed one page at a time. In short, after such transitions, the set of pages of highest utility are often not in memory, leading to demand paging which provides a poor user experience because of slow input/output (I/O) transfer times.

Although some transitions involve the deliberate eviction of pages from memory, and others result in sudden demand for memory, still others result in pages falling inactive and being swapped to disk. More particularly, memory pages that are in working sets may be trimmed and placed into a cache of pages that are not in use, referred to herein as a standby page set (e.g., a standby list in a Windows®-based system), along with the pages of files that are closed. To reduce the number of disk reads and writes, memory management tracks which pages of memory in the standby page set were least recently accessed, and when memory is needed, selects those pages for transferring to disk, essentially in a first-in, first-out (FIFO) type of queue.

Although this technique works to an extent in reducing disk transfers, because it results in the pages most recently used by processes being those that remain in memory, modern applications have large code and data requirements. As a result, in the short term, pages generally can be recalled from this standby page set, however over a longer term, with conventional memory management, the standby page set's simple FIFO queuing results in erosion, in which possibly valuable (but not recently used) pages are overwritten with less valuable (but more recently used) pages. Consequently, a significant number of I/O transfers to and from the disk are necessary. Even on powerful systems these I/O transfers act as a bottleneck, whereby the system underutilizes the large amounts of available memory, leaving the CPU idle for large amounts of time.

In sum, contemporary programs require large amounts of random access memory and fast processing capabilities, which contemporary computing devices offer. However, current memory management technology does not adequately match these resources together, because current memory management was developed at a time when memory was scarce, and was thus designed with the general view that substantial disk usage was inevitable, yet not that burdensome because applications were small and multitasking was rare. As such, conventional memory management does not attempt to limit disk usage, beyond keeping the most-recently accessed pages in memory. In contemporary computing, this results in a significant amount disk usage, thereby providing a bottleneck that hurts both actual and perceived performance.

SUMMARY OF THE INVENTION

Briefly, the present invention is directed towards an improved memory management architecture comprising systems, methods and mechanisms that provide a proactive, resilient and self-tuning memory management system. The memory management system works to provide actual and perceived performance improvements in memory management, by loading and maintaining in memory data that is likely to be needed, before the data is actually needed. Pages of data may be prioritized with a value/score according to various factors, including their utility, frequency of use, time of last use, ease of data transfer and other, context-based information. Mechanisms work to pre-fetch and/or maintain the more valuable data in memory. If the data needs to be swapped out or overwritten, the data may be automatically brought back in a resilient manner, not because of actual demand, but rather because of expected demand.

By having the memory filled with appropriate data before those pages are needed, the memory management system substantially reduces or eliminates on-demand disk transfer operations, and thus reduces or eliminates I/O bottlenecks in many significant consumer scenarios. To this end, implementations of the present invention comprise various mechanisms directed towards historical memory usage monitoring, memory usage analysis, refreshing memory with highly-valued (e.g., highly utilized) pages, I/O pre-fetching efficiency, and aggressive disk management.

To obtain the information needed to assign a value to a page, a rich set of information about each page is tracked via tracing and logging techniques, preferably over a relatively long period of time. This measured data is processed into manageable information, which is maintained and accessed as part of a decision-making process that rebalances the memory contents in response to memory-related events and/or on a timed basis so that more valuable data will be kept and/or pre-fetched into memory over less valuable data.

The priority value enables a standby page set (e.g., a standby list in a Windows®-based system), of memory pages to be prioritized, such that pages in the standby page set can be of higher priority in terms of value relative to other pages, regardless of when last referenced, and thus kept in memory over other pages. Proactive and resilient pre-fetching loads valuable pages from disk to the standby page set, in an order determined by the priority. The loading is preferably performed in a low-priority, background I/O transfer to avoid interfering with a user's normal operation, although it also may be performed in a foreground operation.

As a result of the present invention, the utilization of the CPU is significantly increased without interfering with normal system usage. For many computer users, the entire set of memory pages actually used is small enough to maintain in memory, resulting in the number of demand faults (to read needed data from disk) being reduced to zero or near zero.

In one implementation, a tracing mechanism observes memory-related activity, and a logger logs the results of the observations. An integrator combines the current logged results with previous logs into a page information database. A mining service accesses the data in the page information database to develop scenario plans therefrom, and the scenario plans are analyzed to prioritize the pages into a list. The list is then sorted according to the value calculated for each page, which was based on the memory usage observations and possibly other factors.

A rebalancer, triggered by an event (e.g., system or time generated) works with an I/O planner to add the pages to a prioritized standby page set, in an order determined by each page's calculated value. The prioritized standby page set includes a number of subsets corresponding to the values for each page. These values may change over time and/or based upon actual usage, and thus pages may thereby logically move between subsets. As memory is needed, whether on demand or for background pre-fetching, the lowest priority data in the subset is paged out first. In this manner, the more valuable pages, as determined by actual usage observations and measurements, as well as context and other information, are automatically put into memory in a non-interfering way, and tend to remain there over less valuable pages.

Other advantages will become apparent from the following detailed description when taken in conjunction with the drawings, in which:

DETAILED DESCRIPTION

Exemplary Operating Environment

Figure 1:
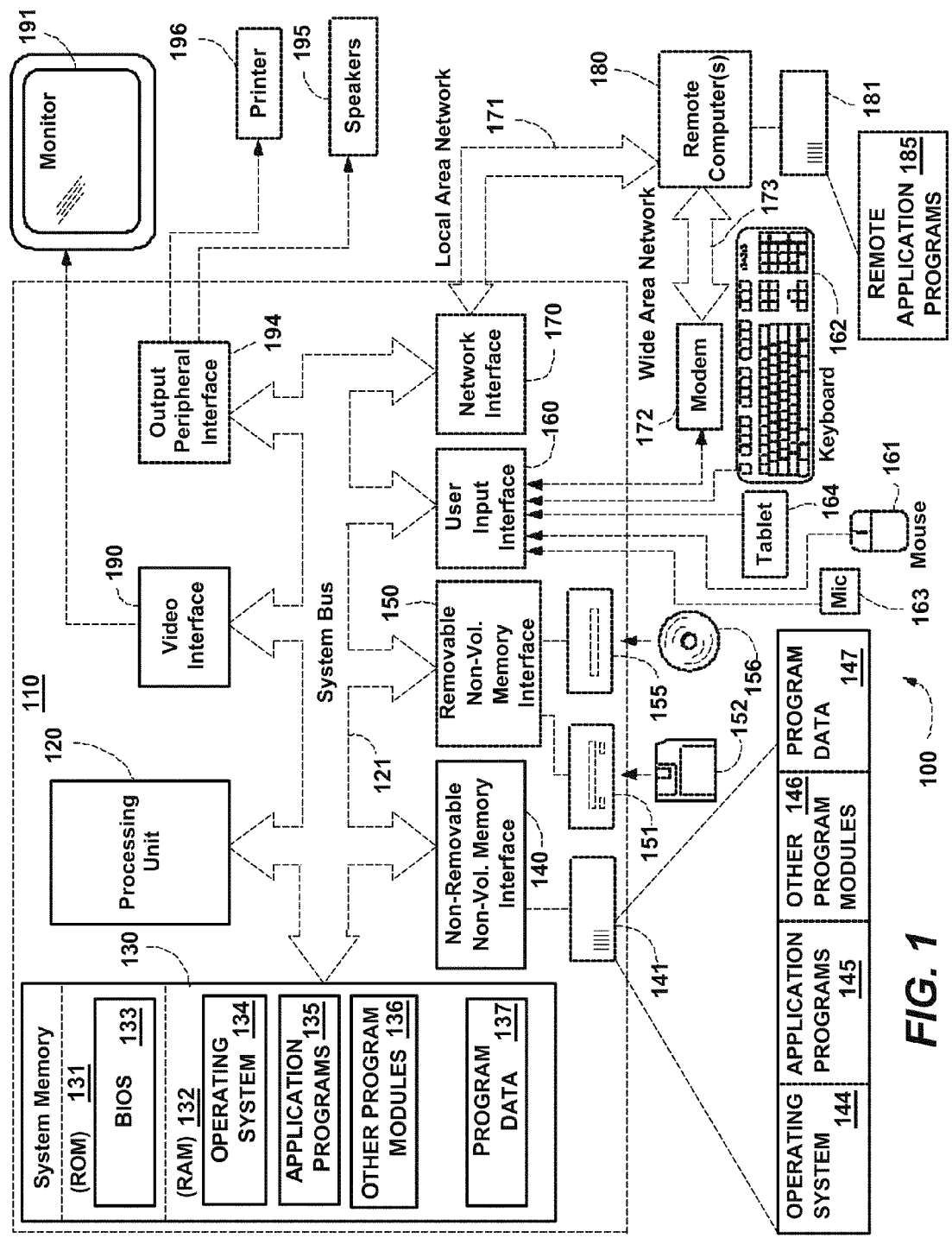
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Proactive Memory Management

Figure 2:
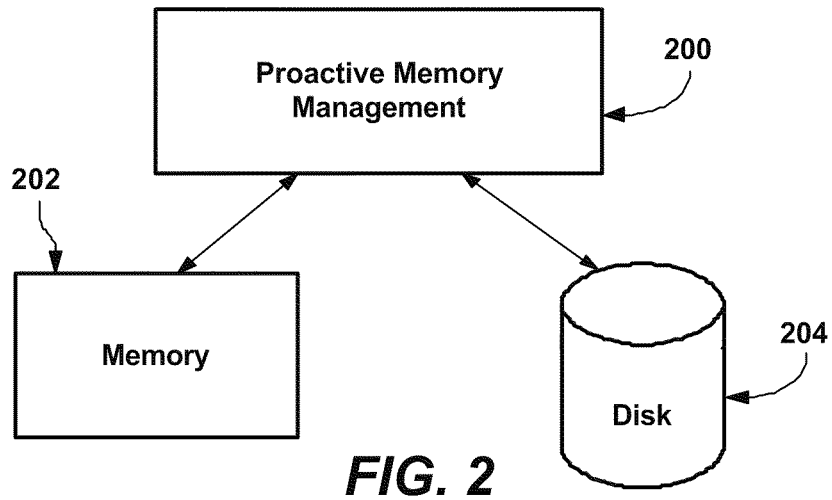
FIGS. 2 and 3 comprise block diagrams representing a basic relationship between system components in accordance with an aspect of the present invention.

One aspect of the present invention is, in part, generally directed towards an improved memory management architecture comprising systems, methods and mechanisms that result in actual and perceived performance improvements across significant aspects of user interface, application program, and operating system software. To this end, as represented in FIG. 2, the present invention provides a proactive, resilient and self-tuning memory management system 200 that monitors a user's memory-related activities and works to ensure, at least to a relatively high rate of success, that needed data is present in random access memory 202 (or simply "memory" as used herein) before the data is needed, rather than read into the memory 202 on demand from a disk 204 (or other, equivalent secondary storage mechanism, such as a flash memory, a network data source, a tape drive and/or virtually any type of data store). In other words, proactive and resilient memory management brings potentially useful data into memory and attempts to maintain that data in memory. If the useful data needs to be swapped out or overwritten, the data may be automatically brought back in a resilient manner, not because of actual demand, but rather because of expected demand.

To this end, the present invention leverages the large amounts of currently available memory to maintain in memory the working sets of potentially active processes, and maintain record keeping, data structures, and algorithms that the system uses to accomplish proactive and resilient memory management. It is expected that such record keeping, data structures, and other algorithms will become more and more optimal over time, however current implementations have resulted in significant reductions in on demand I/O transfers.

As can be readily appreciated, by having the memory 202 filled with appropriate data (e.g., arranged in pages) before those pages are needed, the memory management system 200 of the present invention substantially reduces or eliminates on-demand disk transfer operations, and thus reduces or eliminates I/O bottlenecks in many significant consumer scenarios. Note that as used herein, the term "page" may refer to the smallest amount of data that the memory management system 200 handles as a unit, (e.g., 4096 bytes), however there is no intention to limit the present invention to any particular fixed amount of data, and thus a "page" of data may be some other fixed amount, or even may be a variable amount of data (e.g., as little as one byte or multiple thereof), or even streaming transfers. Thus, a memory management system that can read/write/stream arbitrary amounts of data, rather than a fixed-sized amount or multiple thereof, for example, is still equivalent to reading and writing one or more pages.

As described below, implementations of the present invention comprise various mechanisms, including those directed towards historical memory usage monitoring, memory usage analysis, refreshing memory with highly-valued (e.g., highly utilized) pages, I/O pre-fetching efficiency, and aggressive disk management. In general, these mechanisms work together as the proactive memory management system 200, to ensure that needed data will be in memory before it is demanded. To this end, algorithms, supporting data structures, and methods extend memory management to operate proactively, by taking advantage of various types of memory usage data and other information which may be gathered continuously and/or over a relatively long time frame. Note, however, that the present invention does not require any particular combination of such mechanisms, but may provide numerous and better memory-related benefits with fewer and/or with alternative mechanisms. For example, by determining a value indicative of which pages are more likely to be used than others, and leaving the more valuable pages in memory, reductions in I/O transfers may be obtained without any background pre-fetching of pages into memory, and even if the information used to determine the value of those pages was gathered intermittently and/or only over a relatively short period of time.

Further, memory management methods and mechanisms of the present invention may improve memory usage by being active not only at times when memory is full and swapping decisions need to be made, but at other levels of memory usage, including when the memory is relatively empty. For example, the frequency at which a loaded page is accessed can be measured independent of whether the system is under memory pressure. Moreover, instead of only managing what is currently in memory, the present invention manages memory globally, including what is currently in memory and what (preferably) should be in memory but is currently on disk, and vice-versa.

The present invention represents memory state in a number of ways, including by adding to the information that is currently maintained about each memory page. Such new information may include each page's frequency of use over time, rather than merely implicit or explicit information on the time of last use. Exemplary implementations also maintain information about pages that are not currently resident in memory. As described below, data structures are used to organize free memory that holds or can hold potentially useful data, and are used to control when this memory is made available for alternative uses.

To obtain the information, a rich set of information about each page is tracked via tracing and logging techniques, preferably over a relatively long period of time. By observing the various pages used by processes when active over a relatively lengthy period, the code that is accessed and the data files that are read are recorded, providing a significant measurement of a page's value to thus establish potential working sets. This measured data is maintained and accessed as part of a decision-making process that rebalances the memory contents in response to memory-related events and/or otherwise (e.g., periodically). In other words, the rich data tracking results in information that when analyzed allows more valuable pages to be kept and/or pre-fetched into memory over less valuable pages, whether value is determined by most likely to be needed data, ease of data transfer, context and/or other criteria.

In general, the present invention maintains untraditional rich information per memory page in order to obtain a relative value for each page, both for identifying high value and low value pages, whether or not the page is currently in memory or in another storage. This rich information (including pattern/frequency/grouping/context data) is maintained in memory (and also persisted) for pages in memory as well as for pages that are no longer in memory (e.g., are currently on a hard or floppy disk, CD media, DVD media, network, flash memory and so forth) or never were in memory. This information is used to preload (pre-fetch) valuable pages that are not in memory into memory, and/or to maintain more valuable pages over less valuable ones. One way this is accomplished is via a working set complement mechanism keeps working set entries containing the rich use information for pages that are no longer in memory but are valid in the address space for the working set. Another way is via an extended standby page set, (e.g., a cache of pages that are not in use, such as a standby list in a Windows®-based system), that is built based on the file page history mechanism, where more physical page descriptors and entries are allocated than there is physical memory, and these are used to maintain use pattern, frequency, grouping and/or context information on pages that leave memory.

Various statistics are tracked to derive reference patterns and/or usage frequency that determine a likelihood of a page being needed, such as a used period count, creation time, last access time and so forth, as described below. These types of statistics may be kept in memory per page entries or ranges/groups that can be used to derive referencing patterns, usage frequency and so forth. Such statistics may be maintained entries and/or objects for files, memory mapping objects or other page groupings. In addition, state machines may be arranged per page or page group that have states beyond age bits, such as to cover when a page was removed from memory and brought back in. This varied information may be used to prioritize pages in memory in subsets, and protect valuable pages from being repurposed, such as when programs reference large quantities of pages once or twice. The prioritization may be explicit, and not inferred from location in a list. The priority may be periodically or occasionally recalculated from captured usage patterns, frequency, context, grouping and so forth.

Further, the cost of bringing a particular page into memory may be a factor in determining its value, e.g., whether the page is pagefile backed, in a small file, or among pages that are sequentially accessed/streamed can be used to establish this cost factor. Such valuation may be per page, but also may be made more compact, such as by maintaining the some or all of the rich information only on a subset of pages, obtaining and/or keeping statistics and counts group of pages, for file objects, for section/mappings, and so forth. Further, state data may be obtained and used as part of the extended page information.

For example, by observing context, factors that are not ordinarily under consideration in memory management decisions may be taken into account, including power state and disk state. Also taken into account are observed events, to take actions appropriate for quick recovery from standby/resume, hibernate/resume, and execution/termination of programs that are known to have large memory impact.

In addition to recording such state information, other mechanisms are available to facilitate the proactive memory management of the present invention. For example, application programs can declare certain data to be less (or more) useful than other data, e.g., data needed to handle a rare error can be declared as not likely to be used again, whereby such data is a better candidate to be assigned or weighted with a lower value. A user can also indicate certain lower or higher priority data, e.g., a user who rarely uses an application's help file can manually provide a setting to indicate its low priority to the application and/or the operating system, or vice-versa, e.g., always keep help data in memory if possible. To this end, application programming interfaces (or similar functions) for applications may be provided to allow programs to contribute to system memory management, such as by specifying that pages (e.g., a region of pages) are no longer valuable, or that another set of pages are valuable. Application programs may also specify contexts and operations that the memory manager can use to track and group values of pages referenced in those operations. In this manner, application programs can mark operations that the application program believes to be important with respect to memory usage, such as displaying a File Open/Save dialog or showing task panes.

The page values also may be used to improve memory management in other ways. For example, when a program goes through large quantities of file pages that are used once or twice, only similar pages get repurposed, and higher value pages are protected. Further, compression of certain pages is also possible, such as by having low and/or intermediate value pages compressed in memory rather than swapped to disk. For example, an application or discovery mechanism may indicate that it may be desirable to compress some large block of (e.g., intermediate or lower value) data rather than write it to disk to free space.

The tracing and logging techniques that are used provide new capabilities for recording memory usage data that go beyond those presently known. New algorithms can mine this data and generate instructions or scenario plans for pre-fetching data from disk in an efficient manner, and for maintaining data in memory based on value prioritization. For example, because of the rich information, a standby page set of memory pages may be prioritized, rather than simply arranged in a FIFO-type queue where there is no quantified priority. With the present invention, pages in the standby page set can be of higher priority in terms of value relative to other pages, regardless of when last referenced, and thus kept in memory over other pages, including those in the working set memory. For example, pages of a certain active process may likely never be used again, even though those pages were recently used, whereby such pages are of less value than pages not used for a very long time but potentially reusable.

Further, beyond observed state data and measured results such as actual usage frequency, time of last use and other measured results, other criteria may be used determine a page's value. For example, the concept of a replacement penalty can be used to determine the value of pages in memory, e.g., randomly scattered data (discontiguous on disk) is more expensive to transfer to and from disk than is contiguous sequential data, and thus it may be more valuable to maintain the randomly scattered data in memory, and transfer the sequential data, such as if a large amount of memory is suddenly needed. Thus, a page's utility can be determined by its I/O transfer expense, along with the historical tracing of its usage and machine and other context such as power and disk state considerations. Still other factors can be used, such as the weight an entity (e.g., application or user) may assign to certain data.

In one implementation, the memory usage of programs is tracked on a machine, e.g., per user, and the potential usefulness of pages on both disk and memory are categorized. From this tracking and categorization, a memory budget may be determined, and based on the budget, a background I/O mechanism attempts to fill the memory with the highest utility pages available, as determined by each page's quantified value. Memory pages thus may be resilient, e.g., removed if necessary but automatically restored when space again becomes available. Note that this approach is in contrast to the general approach to memory management, which relies on reactive demand paging (with limited clustering or pre-fetching) to bring pages from disk only at the moment of first time usage, and preserve them in a FIFO manner. With the present invention, when pages are resident, memory structures preserve the pages in memory on a prioritized basis, which may vary over time as they are used, such that higher utility pages remain in memory unless and until the memory is needed for other current activities.

In order to identify high (as well as low) value pages, page value and/or access pattern data is propagated to and maintained in a non-resident persistent store, whereby this information (e.g., including pattern, frequency, context and/or grouping data) is persisted across boots. Note that in addition to writing the page data to files, they are also maintained, including interpreting the data, building new values, and/or mining the data to discard redundant or unnecessary data, such that what is saved in the persistent stores comprises not just the page use data, but also discerned pattern data. As described below, the page value and access pattern data that is maintained and used by memory management is captured by tracing and/or and sampling page references, along with other contexts and events (as described below). In keeping with the present invention, the tracing and sampling operation goes beyond simply keeping counts and a small amount of state per page in memory. To this end, the tracing and sampling mechanisms include PTE (page table entry) accessed bit tracing that logs when access bits are reset. Note that by measuring and maintaining the rate at which the access data is walked and reset limits the amount of data that is logged, e.g., for pages frequently referenced, the information is not logged at every access, but rather the rate at which PTE access bits are reset may be maintained. Further, page faults (hardfaults and soft/transition faults) and read and write file requests may be logged. Mechanisms for snapshotting process working sets can also obtain page value data, as can mechanisms for tracing pages as they leave memory or as they are trimmed from working sets.

With this information, pages may be grouped and the information mined, both for pages in the persistent store and in memory, by their last access times, usage patterns, usage frequency, virtual or physical locality, by when pages were trimmed, and so forth. These groupings may then be used to efficiently swap out regions of pages at a time, and may be used in layout in the destination, such as in pagefile. For example, if a few pages are used, the whole group may be brought in efficiently. Mechanisms also can perform "smart clustering" by using the persisted file/page history, such as to bring a whole file in at a time, and so forth. Pages may be further grouped by which processes use them, over which part of a process lifetime (e.g. launch, shutdown) the pages are used, by which pages are hard-faulted within a period (e.g. disk bound operations). Other ways of grouping pages include pages referenced around task-switch, mouse click, hover, focus and other user input, time based usage such as on the particular times-of-day and/or days-of-week, by the processes of a specific user, and other contexts, including application-specified contexts.

In general, memory management in accordance with the present invention may track and take action on a rich set of events and contexts, including task switching, window creation, dialog, change of focus, mouse hovers and clicks, and other user input events. Other events and contexts include application launch and shutdown, system boot, login, shutdown, standby/hibernate and resume, switching users, video, audio and/or similar media play events (e.g., begin and end), video time-shifting, remote connection to the system (including remote desktop, telnet and so forth, and application specified contexts.

In accordance with an aspect of the present invention, not only may more valuable pages be kept in memory over less valuable ones, but more valuable pages may be loaded into memory (pre-fetched) over less valuable or unused pages (the memory is automatically populated) even when there is no actual demand for those pages. This population and/or rebalancing may be done at various times and in various ways, including after re-boot, after a large amount of memory has been freed, or even somewhat continuously or at least regularly, preferably as a background operation. Preferably, the population mechanism used by the memory manager is unobtrusive, and based on idle priority I/Os and idle detection mechanisms. As described below, this is not just a scheduling algorithm, but may operate in a throttling fashion by watching incoming normal I/O patterns, and scheduling background I/O when it is not likely to overlap with or cause a seek for normal I/O. Idle detection mechanisms (e.g., queued as an idle task) determine when the system is idle by looking at user input, CPU and disk, so as to perform the memory balancing in an unobtrusive manner. Notwithstanding, foreground population of the memory is also valuable at times, and thus some or all of the pre-loading of the memory can be high in priority.

During pre-fetching, I/O operations may be thus managed to provide efficiency by mechanisms that restrict interference between active applications and programs doing background work. For example, I/O transfers can be sorted to reduce seek times, and I/O transfers may be prioritized so that background (e.g., pre-fetching) operations do not delay foreground operations and interfere with a user's normal system usage. Further, mechanisms may be provided to categorize I/O requests and pass this information through the driver stack, so that low level mechanisms are able to schedule I/O with appropriate priority. This allows categories of I/O with low priority to not interfere with higher priority categories, which may require avoiding possible priority inversions when a given operation is requested multiple times under different categories. I/O from different categories may be dispatched using algorithms that seek to recognize prevailing patterns of use and to minimize interference.

One of the aspects of the I/O operation is to leverage under-utilized resources without hurting the performance of other user and system activity, however problems may occur in reading the high-utility file pages from the disk without interfering with the user's foreground applications. One such problem is the requirement to pre-fetch from files that the user has opened exclusively, such as registry files and the temporary internet files cache index. In such a situation in which the file is already exclusively opened, the file cannot be normally opened to pre-fetch from it. Similarly, if the memory management mechanism successfully opens a file for pre-fetching, and an application that requires exclusive access to the file tries to open it, the application would fail, resulting in what would be perceived as random application errors. This problem may be bypassed by calling a special API to open the file in an atypical manner in which the file system does not update the sharing information for that file.

Another I/O related problem is directed to issuing I/O requests in a way that does not interfere with higher priority I/O requests on the system. This can be accomplished, in part by not starting a low priority I/O if the disk has not been idle for long enough (e.g., 75 ms) since the last normal I/O. However, this leads to a priority inversion problem, which may be solved by sending a dummy read with a special flag down the I/O stack. Note that the sending of a dummy read packet is one way to communicate with the I/O stack to notify it of priority inversion, which works even when the actual request is broken into to many sub-requests that are scattered in the stack such that they cannot all be reached through the original request handle. When the filter driver sees the corresponding IRP (I/O request packet), it raises the priority of all of its outstanding I/Os that overlap with that range, and the dummy read IRP is then completed without performing any real work. However, even with this fix, issuing a large list of low priority paging I/Os can block a normal or high priority thread. Thus, this can be avoided by issuing only a few low priority pre-fetch paging I/Os, for a single file at a time, which greatly reduces the potential for priority inversion, and shortens its duration. With these improvements, once the high utility file pages on disk and the low utility pages in memory are identified, requests can immediately be queued without worrying about interfering with the user's current activity.

As a result of this aspect of the present invention, the utilization of the CPU is significantly increased without interfering with normal system usage. For many typical users, the entire set of file-backed pages actually used is small enough to maintain in memory. These needed pages may be preloaded following boot, and also restored if a temporary high demand for memory ever occurs and those pages have to be swapped to disk. Note that if the aggregate working set of needed memory is too large for a given application and system, subsets of the working set may be maintained in memory, while the present invention will strive to provide I/O efficiency for the balance of the pages.

However, in testing many common consumer scenarios, it has been shown that the total number of pages referenced even in a relatively complex workload fits into contemporary amounts of memory. For example, as determined across a variety of experiments, the pages needed for some very significant workloads were able to fit into the memory of machines with 384 megabytes of RAM, and many into 256 megabytes of RAM. Because the memory is larger than the need, the present invention makes its feasible to preload the appropriate pages and eliminate page faults, and thereby allow user applications to run at full CPU utilization in response to user input.

As a result of the elimination (or near elimination) of page faults, the present invention allows the disk to be managed far more aggressively than is presently done. For example, in many cases it is possible to eliminate a situation in which a resume from a standby state is delayed for disk spin up. Thus, one significant benefit of proactive and extended memory management of the present invention is that portable devices, such as tablet computing devices, laptops and other such devices may run for long periods of time without reading from the disk. Keeping the disk from spinning when on battery power represents a significant power savings advance for mobile users, as a disk that is spun down for extended periods increases battery life on portable machines, and increases disk life in general.

Figure 3:
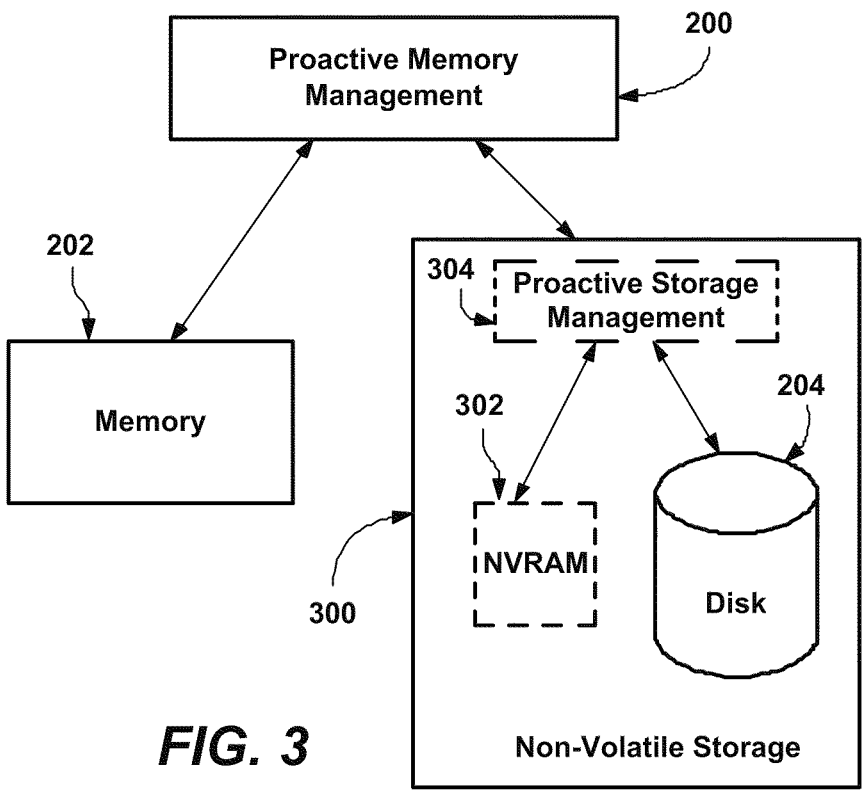

Absent disk reads, the only reason to keep a disk spinning is to satisfy writes. However, typical write activity comprises repeated writes to the same disk sectors, and the number of distinct sectors written over long periods is typically modest. As a result, a simple disk sector cache, using battery-backed up memory or other non-volatile NVRAM can generally handle writes, as represented in FIG. 3, wherein a relatively small amount of optional (as represented by the dashed box) non-volatile random access memory (NVRAM) 302 can be part of an overall non-volatile storage system 300 that allows the disk to remain spun down when some writes cannot be avoided or are desirable, e.g., when a user saves a document. In one implementation, NVRAM of 32 megabytes enabled tested systems to hold off such disk-bound writes for relatively long periods, during which the disk was able to be spun down, while performing common tasks like reading email, browsing the web, editing and saving documents, and so forth. Note that the non-volatile random access memory 302 can be managed proactively by an optional proactive storage management system 304 (which may be somewhat similar to the proactive memory management system 200 described herein) so as to swap lesser-value stored pages from NVRAM 302 to disk 204 when the disk is spinning, to free up space for when the disk later is spun down.

Although spinning down a disk imposes a severe penalty on the first required disk access, careful memory and sector cache management will enable the avoidance of synchronous delays in most situations. This will not always be possible, however, and thus the operating system will have to make strategic decisions about when it is most advantageous to stop and restart disks, and in some cases, future applications might be able to assist in bridging disk restarts.

To summarize, in general, the present invention is directed towards memory management techniques that substantially reduce the need to use the slowest component, the disk, as a factor during normal system use. The present invention, via a new proactive and resilient approach to memory management, is arranged to deliver consistent responsiveness on significant memory related operations even after booting, fast user switching, or exiting a big application such as a game program. Reliably fast resumes from standby that do not get delayed on disk spin up also result from the present invention, as well as reduced response times for large and expensive operations that are presently disk-bound due to demand paging. Other benefits result from self-tuning memory caching and automatic file layout on disk that adapts to system usage patterns and provides improved overall performance. Still other benefits include dramatically reduced media glitches, by protecting the memory and disk bandwidth used by media applications, protection from background activities such as antivirus scanners, file indexers and logon scripts that can cripple interactive responsiveness, and extended battery life, low noise, and low vibration for mobile devices, which result from keeping disks spun down for long periods of time. Improved streaming capabilities for media and eHome-like applications that have multiple background streams also result from the present invention.

The following section describes various example implementations, which should be noted are only some of the ways to utilize the information that can be acquired to manage memory.

Example Implementations

At least one example implementation of the present invention described below was implemented on a modified system running Microsoft Corporation's Windows® XP SP1 operating system and the Windows® NTFS file system. Notwithstanding, there is no intention to limit the present invention to any particular operating system or type of memory management, but on the contrary, the present invention is intended to operate with and provide benefits with any computer having memory managed by a memory management system, because the present invention includes is a speculative and intelligent cache management scheme. Moreover, although an example implementation was arranged with a disk drive as a secondary store from which the memory is loaded, it should be readily apparent that the secondary store is not necessarily a disk drive, and includes alternatives such as flash memory, a network data source, a tape drive or virtually any type of data store, and in fact a computer system that is completely diskless can benefit greatly from the present invention.

Figure 4A:
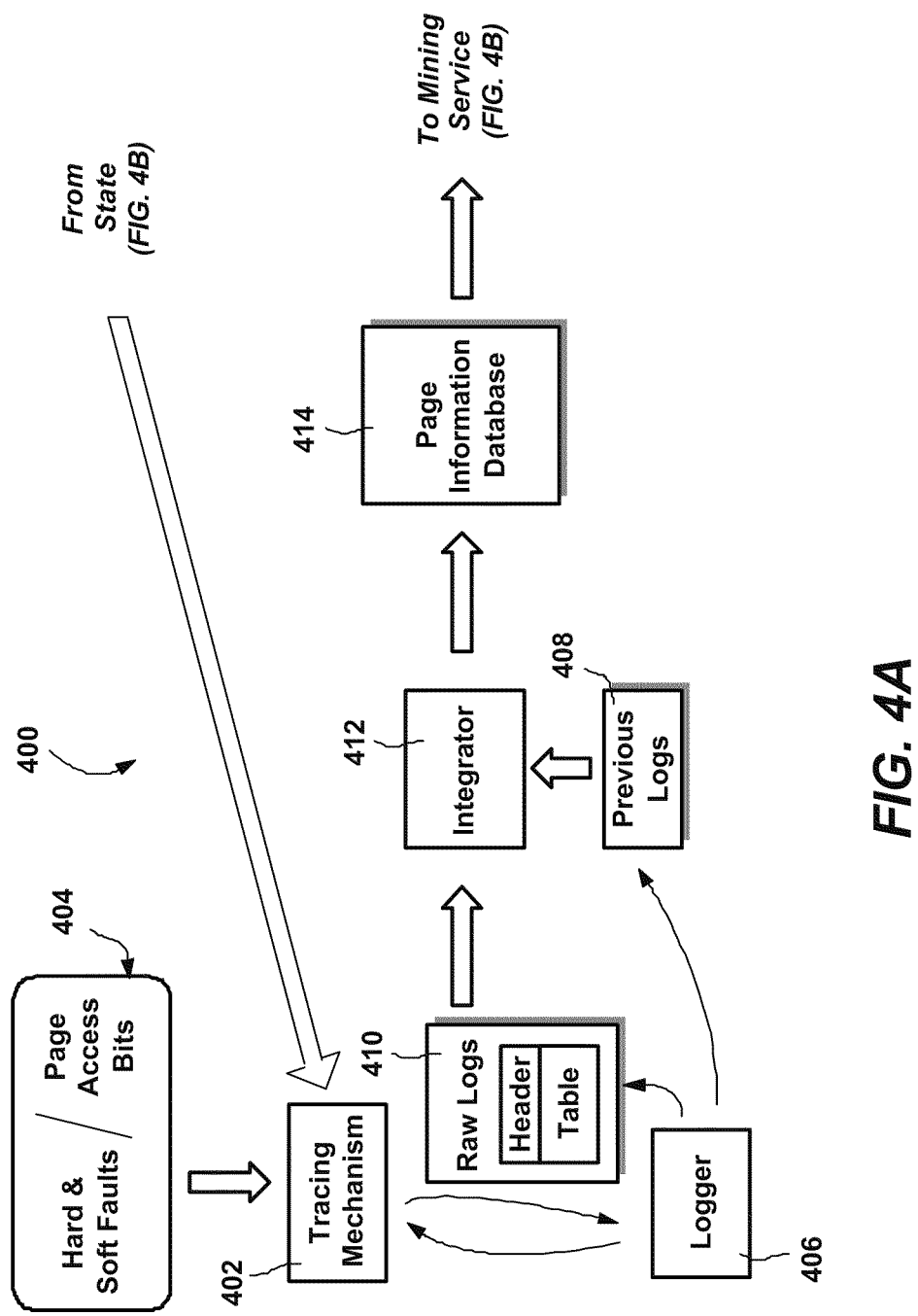
FIGS. 4A and 4B comprise a block diagram representing a general architecture suitable for performing proactive memory management in accordance with an aspect of the present invention.
Figure 4B:
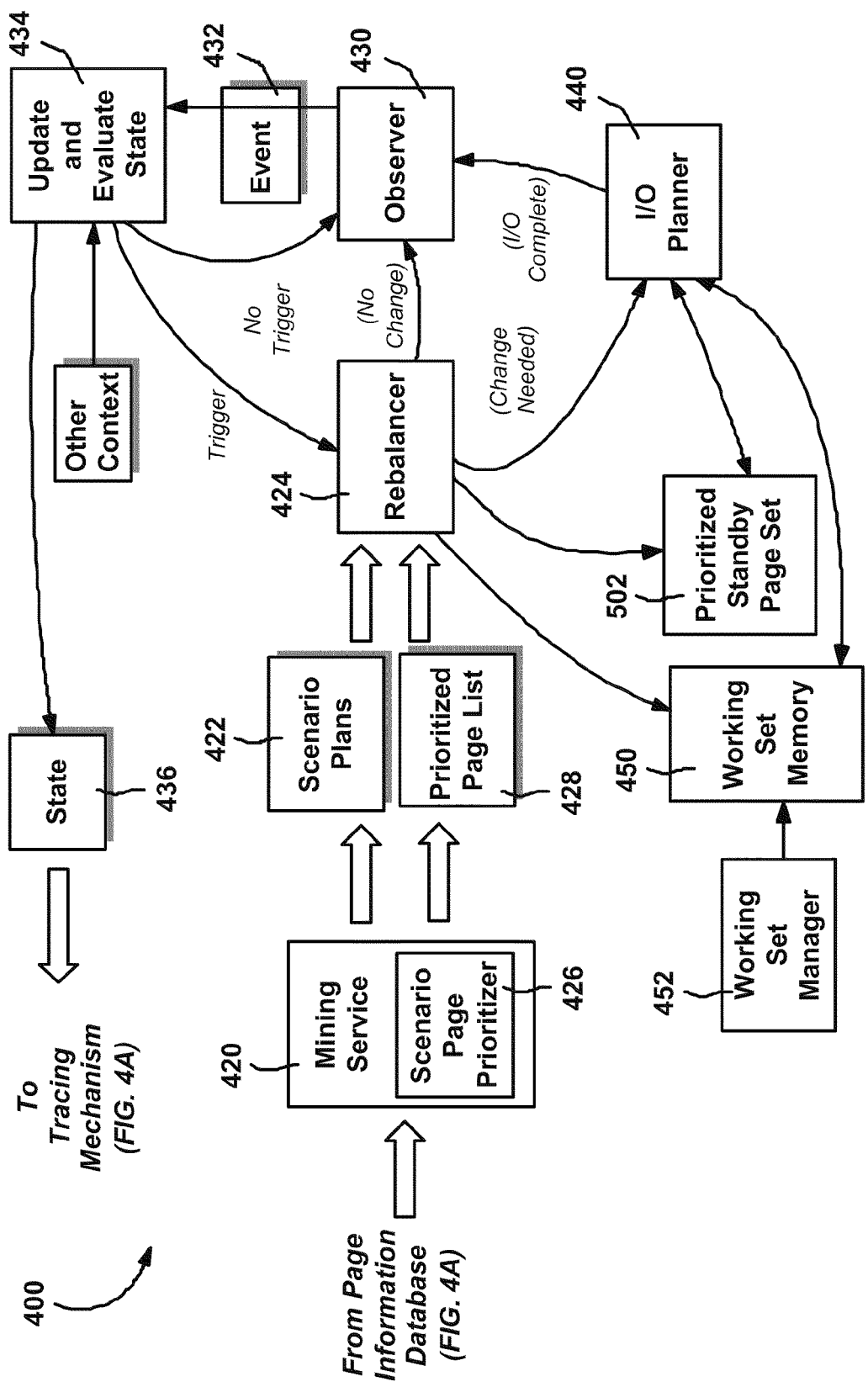

In accordance with one aspect of the present invention and as generally represented in the example implementation 400 of FIGS. 4A and 4B, various mechanisms that implement the present invention's approach to proactive, resilient and self-tuning memory management have been developed. Such mechanisms provide for the tracing and logging of referenced pages, the protection of more valuable pages from erosion, and the fetching and restoring of these pages to memory following transitions. These mechanisms run as part of the kernel when necessary, but may also include user mode (unprivileged) services.

As described above, to trace and log the memory usage and other context data, the present invention gathers information to obtain rich data, including which pages are accessed for a current user's frequent activities. For example, each access to pages by a single process, or across the whole system in a specified time period, may be recorded. To this end, as represented in FIG. 4A, in an example memory management implementation 400, a tracing mechanism 402, or tracer, traces page references by monitoring page-related activity 404, including monitoring access bits that correspond to the page being accessed, and watching as pages are brought into memory via faults.

As also represented in FIG. 4A, the trace information is persisted by a logger 406 into data structures (e.g., including one or more previous logs 408 and raw logs 410, described below) that identify each page as a file-offset pair, or, for private pages such as heaps, a working set-virtual address pair. More particularly, in one implementation, the tracing mechanism 402 records process-related virtual memory events in kernel buffers (not shown), from which the raw logs 410 are later assembled. Another useful piece of information that may be obtained by the tracing mechanism 402 tracks whether the page (when referenced) was memory resident or had to be hard-faulted from the disk. The virtual memory events include initial accesses to particular pages of an address space and access counters that record the rate at which the page is being re-accessed. Also included is information on the state of the machine, and the recognized contexts active at the time of the trace. For each page, additional information may be maintained, such as in which of the recent launches of a scenario each such page was referenced, and similar system state information.

Thus, an important basis of the memory management approach of the present invention is to log memory management events observed on the system, that is, representations of accesses to portions of virtual address spaces by particular processes. It may not be feasible to record every access, and thus in the described implementation the work is performed at the page granularity, to record first accesses and information about the frequency of subsequent accesses.

The logger 406 operates by taking the kernel traces and formatting them as raw logs 410. Responsibilities of the logger include ensuring that resource limits are respected so that the raw logs will not fill up the user's disk. The traces are thus recorded in the raw logs 410 representing the access pattern for a particular instantiation of a process over some reasonably short interval. For example, logs might be collected for a single boot or resume from hibernate, for the period following some user event, such as bringing up the control panel, for the period that an application is the foreground application, for some interval of time not pegged to a particular event, and so forth.

In a described implementation, logs include a header, which may contain context, memory-state, and time information, and include a table of <source, offset, hardfault> entries, where source is the file or process address space accessed at a given offset, and hardfault indicates whether the data was read from disk, which provides a rough measure of cost.

In addition to tracing page use for various contexts, information on access patterns and lifetimes of individual pages that are in memory also may be maintained, providing the ability to make better decisions regarding the utility of pages within working sets. For example, contemporary operating systems keep only two bits of age information per page, whereby to the memory manager, all pages that were not referenced recently (e.g., in the last couple minutes) tend to look the same. In the present invention, the information to which the memory manager system has access can include a number of periods (e.g., minutes) in which each page was used, as well as the periods in which each page was created and last accessed. In keeping with the present invention, mechanisms keep this information about pages even when those pages are paged out to disk. In other words, not only is the page tracked while in memory, but this information is maintained while the page is on disk. This additional information provides a significantly more accurate picture of how the page is being accessed over its lifetime.

The tracing mechanism 402 can work on multiple active traces simultaneously. These traces may include continuous traces, which for example may be assembled one after another until they reach a particular size (e.g., 100,000 records) or until they represent a particular duration (e.g., a five minute interval). Note that one implemented tracing mechanism has relatively very low overhead, (e.g., 0.1% CPU with a 450 MHz processor, plus a few megabytes of memory to log a day of page usage), enabling such continuous tracing as to which pages are being referenced, without burdening the system. Tracing may also be performed as an intermittent, sampling-type operation, such as triggered automatically or in response to requests through a GUI tool for testing or training purposes, which allows the collection of page information to be associated with particular activities and transitions, such as application launch, fast user switch or standby resume.

Note that rather than starting the tracing/logging from scratch for a user/system, some amount of pre-training may be performed (e.g., for other users and systems). This allows the copying of some prebuilt file and page value and information database at setup time, or other suitable times, such as when an application program is installed. This static solution helps to accelerate the learning curve that would otherwise be required anytime a new user, new system, new operating system version and/or new program was added. Thus, the present invention provides advantages via value-based selective or whole memory loading, where value is determined at least in part on pre-observation, whether by tracking usage history, and/or by training (including simulation, code analysis, runs on a different machine and so forth). To maintain the data, a persistent repository of information pertaining to page use and value is built, used and stored, which may be in any file, including executable files, documents and special purpose data files and databases. Further, note that such pre-obtained knowledge also provides significant reductions in on demand I/O transfers even without performing the dynamic information gathering via logging and tracing. For example, on demand I/O transfers can be reduced by simply providing prebuilt page grouping files, e.g., when a user faults on the first page to display the Control Panel, other related pages are brought into memory efficiently from the disk.

Via the tracing mechanism 402 and further processing described herein, the memory management system builds and maintains scenario plans (e.g., files) 422 (FIG. 4B) that contain the data that can be used to establish one or more measurable values for file pages, such as usage frequency. To this end, various components may process the data into a suitable form for making memory management decisions, including an integrator 412 that essentially combines the previous logs 408 and raw logs 410 into a page information database 414.

The integrator 412 represented in FIG. 4A is a service, which may run in a user-level process, (as kernel access is not required), that reads the raw logs 410, processes them and integrates the information they contain with page information for similar contexts already stored on the system (e.g., in the previous logs 408). Initially there will be no previous information, but the system will quickly reach a state where raw traces serve primarily to update and refine the information already known from previous occurrences of a particular context. One straightforward integrator 412 that has been implemented keeps a history bit vector for each page mentioned in traces for a given context class. To integrate each new instance, the history bit vector is shifted and a new bit is added representing the most recent time period. Pages that appear in the new log have a "1" as the new bit, while others have a "0." Pages that appear for the first time are added to a page information database 414, while pages that have not been recently used may be removed from the database 414.

In this manner, via the integrator 412, the raw logs 410 covering particular events or intervals are integrated with previous logs 408 containing information known about previous instances of similar events, such as previous runs of the same program, to provide the page information database 414. The page information database 414 essentially collapses the information contained in the logs, to reduce the amount of memory required to track this data, while reorganizing the information so that similar events are appropriately grouped, and commonality in files and pages between a raw log 410 and previous logs 408 is identified.

As represented in FIGS. 4A and 4B, the information in the page information database 414 may be mined (e.g., by a mining service 420) to produce the scenario plans 422, which indicate the likely composition of future virtual address spaces and the likelihood of access to pages within the virtual space in particular contexts. As described below, these scenario plans 422 are used by a rebalancer 424 to predict the future accesses for the system, and allow the rebalancer 424 to create new memory management plans in response to events observed by the system. For example, scenario plans may be constructed from a fixed set of page information files comprising information regarding scenarios known to be important to the system, such as booting and shutting down the system, and resuming from hibernation. Particular messages are used to establish contexts. To this data may be added information from scenarios selected by a user, e.g., through an interactive graphical tool, and the different scenarios may be given default priorities that can be modified through the interactive tool.

When scenario plans 422 change, a scenario page prioritizer 426 (e.g., a user mode service incorporated in or otherwise associated with the mining service 420) processes the scenario plans 422 to generate a list of pages that should be brought into memory and protected. This regeneration also may be triggered based on a maximum elapsed time since last performed, such as to ensure that the plans are regenerated at least once every fifteen minutes. In one implementation, to accomplish prioritization, each page is assigned a calculated priority score. When the scores are determined, the pages are then sorted by their calculated scores to build a prioritized page list 428.

One factor in scoring, frequency-based usage, is determined by counting how many times that page was used in recent time intervals, e.g., within the last hour, last eight hours, last day, last week, and so forth, according to data scenario files. To this end, the page prioritizer 426 keeps track of page use frequency for various time slots, such as via one hour, eight hour, one day, three day, one week and three week buckets. Based on the number of times a page has been used in each of these buckets, a page may be assigned a score, such as between 0 and 127.

Each scenario plan also may track in which of the last number of runs (e.g., thirty-two) the page was used, with timestamps for each launch. Heavier weighting is given to recent uses of the page. Further, the scores of pages that are in known scenario plans, such as a scenario plan maintained for the Start Menu, may be raised to give them a higher priority.

The scoring of pages may also take into account the context in which a page is observed as being used. Thus, the scores may be contingent upon the state of the machine, the applications that are running, or recent user actions. Such sophisticated approaches to page priorities will likely be refined over time. Note that because each scenario plan maintains time and history information about the last number of runs (e.g., thirty-two) in which pages were accessed, it is possible to determine how frequently a particular file page has been accessed across the scenarios, relative to the other pages for which information has been recorded.

To generate events, as represented in FIG. 4B, an observer 430 is provided. The observer 430 preferably comprises a thread in the operating system kernel that monitors system state, including pronounced changes in the physical memory usage. In addition, explicit calls may be made to trigger state evaluation when certain actions are performed, such as beginning shutdown or hibernation. Further, applications can call into the kernel to notify the system of potentially interesting state changes to which an application-chosen label can be applied.

In one implementation, traced events include application launches and recognized windowing messages passed down to the kernel. Window message hooking allows the system to detect hints that applications or system components may be performing a significant memory-related operation, such as the launch of the Start Menu, or the creation of dialogs or windows for File Open, Print, or Control Panel. Heuristics may be used to avoid redundant tracing of frequent or closely packed events. In response to these events, the kernel tracks page usage for an individual process by utilizing the accessed bits on page table entries for pages. These bits are cleared when tracing begins and checked at the end of the trace. Any removals or accessed bit resets during the trace are also logged. Pages that are accessed through ReadFile and hard-faults in which a disk read is performed are logged.

When a change in the system state is observed or a call indicates an important event, an event 432 is generated and the system state may be updated by a state evaluation and updating service 434. Tracing may be invoked or terminated, and/or state data (and other system memory information) 436 passed thereto, and rebalancing may be triggered, as represented in FIG. 4B. The state includes active contexts as well as the current distribution of memory between working sets, the zero-list, the dirty-list and the standby page set. System memory information includes virtual address sizes and working set sizes, process snapshot data, hard and soft faults, hardware-supported memory-access bits, the per-page usage information derived by the operating system, and any other measured or observable data, contexts and state that can be used to determine page values, as described above.

As generally described above, either continuously or at the end of the trace, the kernel produces a trace buffer, which includes lists of the specific pages needed from various files, as well as a variety of internal memory management counters, such as how many zero/free pages were on the system and the constitution of a standby page set. As also described above, the trace buffers are collected by a user-level service and used to update the scenario files, e.g., maintained in a pre-fetch directory. The scenario files may be named based on a context that was traced, such as AppLaunch.WMPlayer.exe-...pfx, or Shell.StartMenuCreate...pfx.

In this manner, system events cause a reevaluation of the system state, and may trigger a rebalancing of memory contents. The contexts are indicated by markers that are fired when particular system code is executed, as well as specified by applications through APIs or the like. The applications may provide UIs through which a user can specify and mark his or her own, individualized contexts. Other system events that may cause reevaluation include large memory allocations and deallocations, the launching of processes, or detection that the user has fallen idle or has resumed work. Thus, the memory manager and rebalancer 424 can take action on triggers/events/contexts, such as to prioritize which pages are more likely to be needed in a current context and value them higher with respect to others, and to preload the memory based on this new prioritization. These contexts may be used by the trace processor to categorize and group traced page use data. When identified, the pages and groups of pages are rearranged in memory, such as to swap them out, bring all related pages in at the same time when one of them is faulted, and so forth.

The memory rebalancer 424 interfaces between the user-mode and kernel-mode elements of the memory management system's pre-fetching policy. As described below, the rebalancer 424 primarily relies on the kernel to identify and order pages on the standby page set, to identify low-value pages and to protect the higher valued pages. In addition to maintenance of higher valued pages, a primary purpose of the memory rebalancer 424 is to populate the memory with the pages that the scenario page prioritizer 426 has chosen, by replacing lower value pages with higher value pages, as determined by priority scores. To this end, the memory rebalancer 424 watches the scenario page prioritizer 426 and kernel memory content counters to determine if it needs to take any action. Note that memory content counters from the kernel give information on how many free/zero pages are available, as well as statistics for each standby page subset (described below) and such as how many pages have been repurposed due to memory pressure.

The rebalancer 424 thus observes the current disposition of memory, and may invoke routines to cause working sets to be trimmed. From this information, the rebalancer 424 then determines a memory budget to be used for storing pre-fetched data. The pool of pages that fall under the control of speculative management is determined by identifying pages that provide low utility, such as pages with zeroed contents beyond certain bounds established for the system. Low utility pages may also comprise pages having valid contents that are not in working sets, and which have not been used in a relatively long time. Via the scenario page prioritizer 426, the rebalancer 424 thus uses the information in the scenario plans 422 to establish a more ideal set of contents for the memory, within its budget. It may query (e.g., via APIs) to determine how much of the contents are in memory and may then modify the plans 422.

If there are free or low value pages, the rebalancer 424 asks the system kernel to populate them with higher value pages using low priority pre-fetching I/O until the higher value pages are brought into memory. To this end, once the rebalancer 424 has established a list of pages according to the budget, the list of desired pages to load (and page out) are passed to an I/O planner 440. These I/O instructions are preferably sorted in the disk queue to minimize seeks, resulting in much higher disk throughput. If the rebalancer 424 is not able to bring as many pages as it would like into memory, the rebalancer 424 remembers where it is in its list, and when more pages become available, continues pre-fetching from that point.

Whenever the scenario page prioritizer 426 builds a new list of pages, or when any of the pre-fetched (resilient) pages that were brought into memory are repurposed due to memory pressure, the memory rebalancer 424 starts to pre-fetch from the beginning of the list. Before the rebalancer 424 pre-fetches the new batch of pages, it clears the preference on previously fetched pages to make them available.

Note that the memory rebalancer 424 may be programmed to be relatively conservative with respect to which pages it wants to bring into memory, such as to avoid interfering with user activity. To this end, the rebalancer is set for performing low-priority I/O operations via the I/O planner 440, and may avoid taking action when the system is under memory pressure. For example, the rebalancer 424 may be set to only replace pages that have not been used for relatively long time, and that have not been used very frequently, and may not take any action if there is not some threshold amount of available memory in the system (e.g., 16 megabytes) of which some lesser amount (e.g., 6 megabytes) is free, zero or other low utility pages.

The I/O planner 440 works to bring in the desired memory contents by issuing I/Os, but is constrained by the need to avoid interference with other I/O conducted by the system. One way that this can be accomplished is to wait for times of relatively light I/O activity and to break the task into rather small transfer sizes. The system may, however, provide this sort of noninterference by implementing a priority scheme. Thus the rebalancer 424, e.g., periodically and/or when triggered, decides what pages should be in the memory, based on anticipated usage, efficiency and so on, as described above, and the I/O planner controls the I/O transfers to adjust the memory contents as desired, in a manner that attempts to minimize interference with other I/O operations.

Figure 5A:
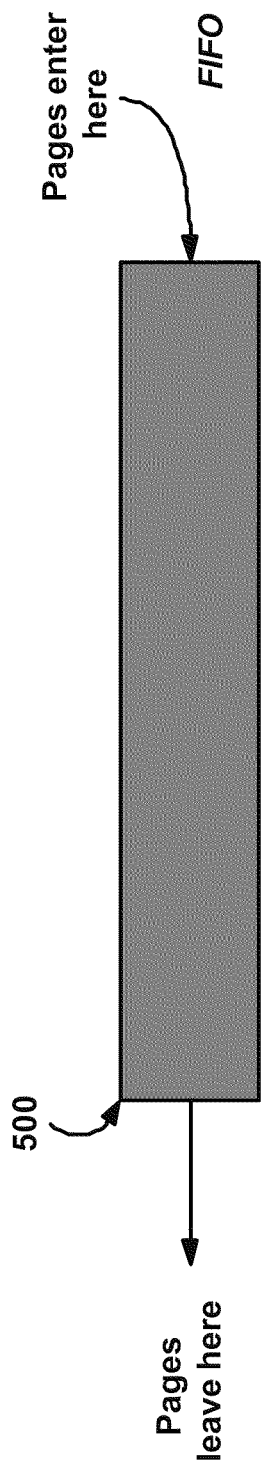
FIG. 5A is a block diagram showing one way in which a standby page set may maintain page data.

As represented in FIG. 5A, in traditional memory management, pages to be paged out are first added to a standby page list 500, which is a simple FIFO list. Being a FIFO list, all pages added to this list 500 are treated equally, with no consideration of their importance. This results in situations where a page that had been a valuable page is repurposed before another page that is unlikely to ever be used, but happens to fall later on the list 500.

Figure 5B:
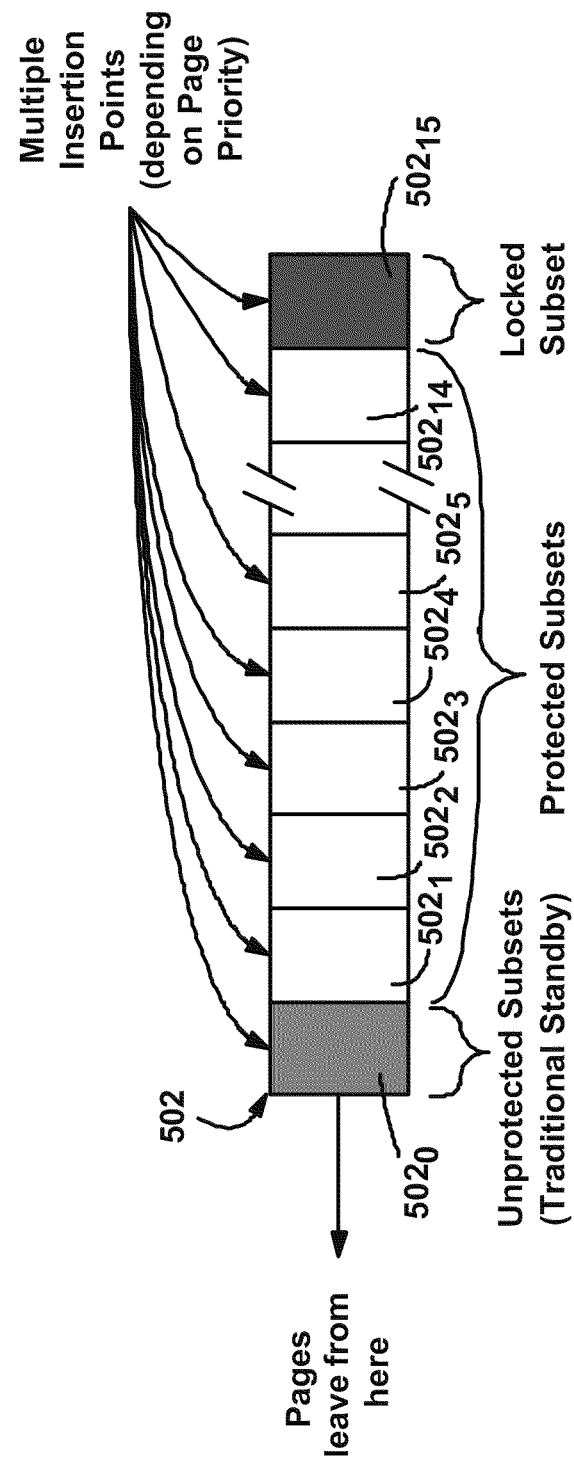
FIG. 5B is a block diagram representing an alternative way in which a prioritized standby page set may maintain page data in prioritized subsets, in accordance with an aspect of the present invention.

In accordance with one aspect of the present invention and as represented in FIG. 5B, to improve on this scheme in a manner that protects more valuable pages, a prioritized standby page set, or cache 502 is provided that takes into account the pages' relative values, as determined by tracing-based priority scoring. As represented in FIG. 5B, such a prioritized standby page set comprises subsets $502_0$-$502_{15}$, each of which contains one or more pages assigned to a particular priority. Note that only a few such subsets (sixteen) are shown in FIG. 5B, however as can be readily appreciated, any practical number of such subsets is feasible, and the subsets may be of various sizes. Subset $502_0$ is an unprotected subset, which acts like the existing standby page set 500 of FIG. 5A; pages which are not adequately traced may go in this list. When a page needs to be repurposed from the prioritized standby page set 502, the page is taken from the lowest priority, non-empty subset.

Thus, when a file is closed or a working set is trimmed, its pages go to the standby page set 502, with a determination made as to which subset the pages should be put based on the additional extended usage information, e.g., stored in the memory manager's PFN database entry for the page. In addition to page life and access frequency fields, there are fields that allow setting the page's priority based on information from scenario databases and the system's current context.

The system's memory management policy thread rebalances (e.g., by invoking the rebalancer 424, FIG. 4B) the prioritized standby page set 502 from time to time, such as once every second. Pages that were put in high priority subsets that are not subsequently used for long periods are migrated to lower priority subsets.

In one embodiment, certain pages are placed into the highest priority subset $502_{15}$, and those pages are never repurposed. This provides a mechanism to lock these pages in memory even under memory pressure. Note that this mechanism is stronger than VirtualLock, because the processes that may need them can go away and come back (and may, in fact, have yet to be created).

Thus, in keeping with the present invention, these mechanisms enable the selection of pages that are desirable to keep in memory. By assigning relative priorities to scenarios, more important pages are not ordinarily repurposed before less important ones. Further, a determination can be made as to a set of small-value or no-value pages that can be replaced by more valuable pages from the disk.

In one implementation, the memory management system divides the standby page set into sixteen subsets, which it uses to sort out different classes of pages and, by ordering the subsets, to grant a greater degree of protection to some classes of pages. As described above, a page containing useful data (such as a file page, or a heap page for a running process) but that is no longer in any working set 450 (FIG. 4B) is placed in a particular subset in the prioritized standby page set 502 based on the preference set on it by the memory rebalancer 424, and/or based on its usage pattern while it has been in memory. As described above, time buckets may be used to track the use of pages, e.g., over ten second units, along with a count of the number of periods the page was accessed in since its creation and the last period that the page was accessed in order to assess its age.

Periodically, such as once every second, the rebalancer 424 walks through a part of the standby page set 502 and re-evaluates which subset a particular page should be in. In general, a page that is not used for a long time is moved into an appropriate lower priority subset.

Table 1 shows how one implementation determines the appropriate subset for a page. If an application needs memory and there are no free or zero pages available, standby page set pages will be repurposed starting from the lowest indexed subset:

TABLE 1

Standby Subsets Prioritization

| Subset Index | Description |
|---|---|
| 15 | For pages locked in memory (optional) |
| 14 | Pages accessed in 40+ periods |
| 13 | Pages accessed in 40+ periods but not used for 4+ hours |
| 12 | Pages pre-fetched by proactive memory management |
| 11 | Pages accessed in 20-40 periods |
| 10 | Pages accessed in 10-20 periods |
| 9 | New standby page set pages with insufficient data |
| 8 | Pages accessed in <=4 periods, but not used in the last 5 minutes |
| 7 | Pages accessed in <=8 periods, but not used in the last 10 minutes |
| 6 | Pages accessed in <=16 periods, but not used in the last 20 minutes |
| 5 | Clustered pages pre-fetched by proactive memory management |
| 4 | Pages accessed in <=2 periods, but not used in the last 1 hour |
| 3 | Pages accessed in <=2 periods, but not used in the last 4 hours |
| 2 | Pages accessed in <=16 periods, but not used in the last day |
| 1 | Pages accessed in <=2 periods, but not used in the last day |
| 0 | Pages not accessed in the last 3 days |

Further, working set pages that are not used for twenty minutes are evicted from the working set memory 450 into the standby page set 502 to make them available for prioritized management. As represented in FIG. 4B, a working set manager 452 is left to manage pages that are recently used, as in traditional time-sharing systems, whereas standby page set management via the memory rebalancer 424 manages pages over longer periods of time.

Conceptually, as indicated by Table 1, in this example implementation, the subset management system uses last-time-of-use-based and frequency-based categories for standby page set management, referred to as a time sieve and reuse ladder, respectively. The concept of the time sieve (as embodied in subsets $502_0$-$502_8$) and reuse ladder (as embodied in subsets $502_{10}$-$502_{14}$) is that pages that are not recently used should be repurposed from the standby page set 502 before other pages, but that extra protections should be afforded pages that have been used frequently, even if not necessarily very recently. Pages on the standby page set 502 are thus organized as a series of subsets, and those pages will periodically be moved from more-protected subsets to less-protected subsets, or vice-versa, based on their lack of usage or actual usage over time. Thus, assuming there is no later need for an unused page, the unused page will move from an "unused-in-5-minutes" subset to an "unused-in-10-minutes" subset, to an "unused-in-30-minutes subset, and so forth, until it arrives in the "unused-in-3-days" subset (or whatever is the lowest). Pages that have been used somewhat frequently over at least some reasonable interval, however, will skip the initial portion of the cascade, or may be held up in some subset for a longer period of time.

What the time sieve and reuse ladder categories accomplish is to separate the pages that have been used for only a brief time period from the pages that have been more frequently used, and then to prioritize these pages within the subsets of their respective categories. The time sieve operates on a least-recently-used gradient, while the reuse ladder operates on a frequency-based gradient. Of course, the gradients need not be limited to any particular times or frequencies, and indeed, may vary based on actual conditions so that pages are moved between subsets and removed from the standby page set as appropriate for a given system.

Note that pages that are read from disk for the first time have to be placed on subsets of the standby page set 502. The classes of pages include pre-fetched pages (subset $502_{12}$), pages clustered with ordinary faults (subset $502_9$) and pages interpolated into pre-fetches by clustering (subset $502_5$). These classes of pages are prioritized in that order, with the pre-fetched pages placed among the reuse ladder pages, the interpolated pre-fetched pages placed among the time sieve pages, and the ordinary fault pages placed between the reuse ladder and the time sieve pages.

In sum, the higher utility pages desired in memory are brought into standby subsets to protect them from normal memory pressure, resulting in significant gains in performance with appropriate decisions in identifying and prioritizing key scenarios. For example, on a 256 MB system consistent responsiveness was provided in many common operations in the shell, components and applications, even after transitions such as boot, fast user switching and memory pressure from a large application. Rapid resumption from standby, (e.g., under two seconds), without significant disk I/O delays, has been consistently achieved. Further, with these mechanisms, a self-tuning policy and a set of rules that can continuously process captured scenario information may be implemented to determine which pages should be in memory.

As is understood from the above description, the efficiency gains from pre-fetching in a just-in-time manner cannot provide a near-instantaneous user experience, due to the sheer size of the required data and the large number of disk locations that need to be accessed. Instead, to provide a significantly improved experience, the present invention recognizes that the pages for a user's favorite and frequent scenarios need to be brought into memory in advance. Thus, once a policy manager has identified a set of pages that should be brought into memory, those pages should be pre-fetched, utilizing the idle periods of the disk. However, it is highly resource intensive to queue large numbers (e.g., hundreds) of speculative asynchronous paging I/Os; for example, if a foreground application needs something from the disk at that time, the application's request will be blocked in the disk queue, potentially resulting in very slow times (e.g., seconds) of unresponsiveness. Idle detection alone is not reliable to avoid such a situation, since a user application can always take a fault exactly when it is decided to queue the speculative I/Os to what appears to be an idle disk.

As described above, the present invention avoids this problem by providing support for prioritized I/O, whereby if speculative pre-fetching is issued to a low-priority disk queue, it will not cause huge delays for paging requests from the foreground application that are queued at a higher priority.

Moreover, if the high priority I/Os are issued one at a time, they may be interleaved with low priority pre-fetching I/Os. The resulting pattern of seeks will significantly impact the disk bandwidth and hurt response times. As a result, to truly limit the overhead of speculative pre-fetching I/O, the support for prioritized I/O may need to be combined with quick and self-tuning idle detection that learns from its failures and changes patterns. When prioritized I/O support is combined with the mechanisms to identify and prioritize the referenced memory, the system is able to protect the operation of a process from interference by other processes on the system. Traditionally this was attempted by changing process CPU priority, but this prioritization was not carried over to the disk queues or memory management, at least not in general purpose operating systems.

Figure 6:
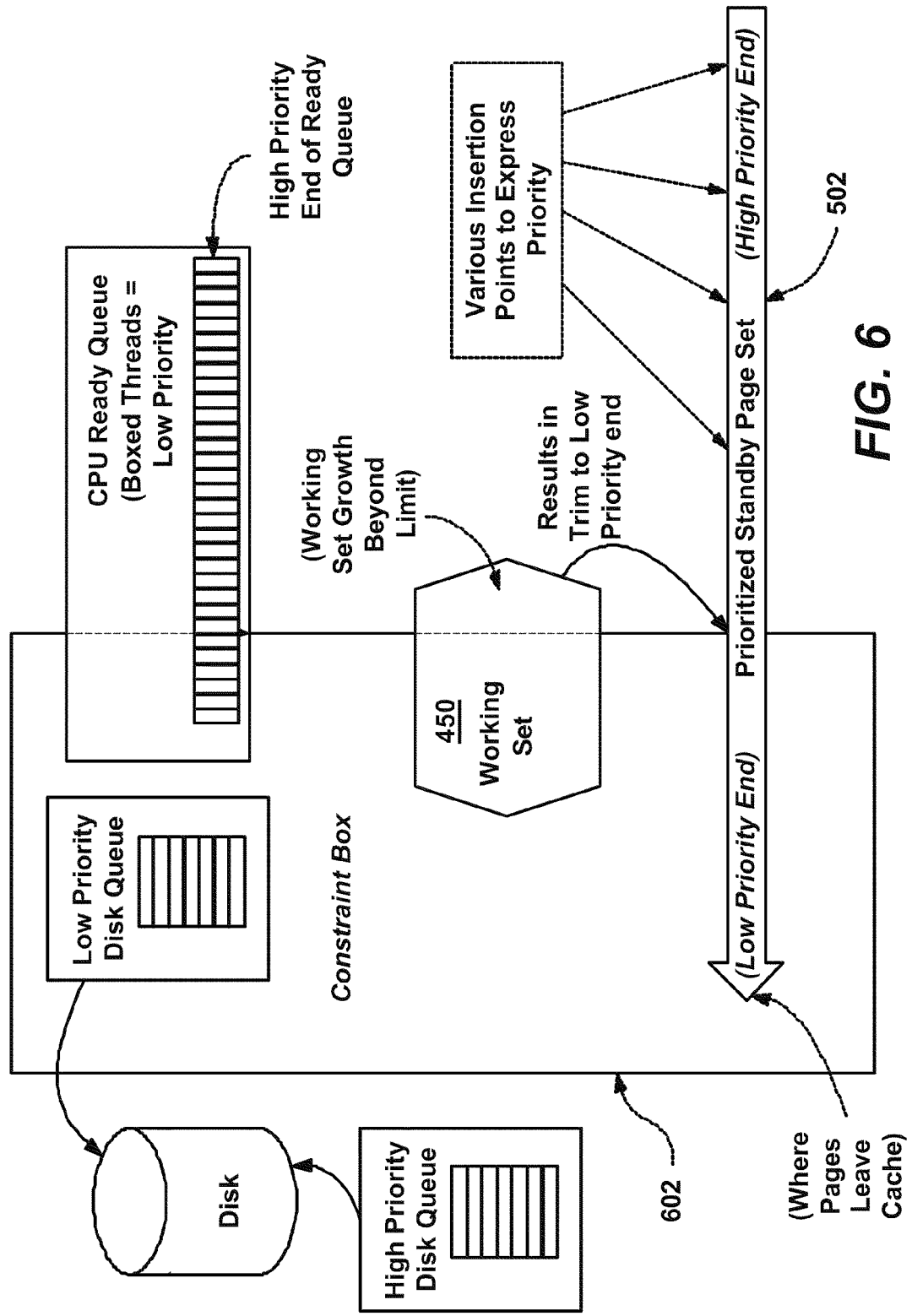
FIG. 6 is a block diagram representing a constraint system to constrain background activities in order to limit interference with a user's applications, in accordance with an aspect of the present invention.

A system of constraints is generally represented in FIG. 6, wherein a constraint box 602 constrains background activities such as antivirus scanners, file indexers and logon scripts, in order to limit interference with a user's applications. The constraint box 602 can also protect media applications from disk and memory interference, which is one cause of glitches in audio and video streams, as well as ensure interactive responsiveness to the foreground applications even under heavy system load.

The integration of memory management improvements with prioritized I/O support provides a basis for a highly responsive and predictable system. Note that the constraint box 602 on its own does not provide fine grained (e.g., sub 100 ms) resource guarantees that a more sophisticated resource manager might provide, but limits the negative effects of interference to response times, such that the system will always appear responsive.

As described above, pre-fetching is a mechanism with which a set of pages may be efficiently read from disk into memory and placed into a particular standby subset. Pre-fetching works by queuing asynchronous paging I/Os for the set of pages that are missing from memory. In the present invention, pre-fetching of directory pages and other file metadata, as well as page-file pages, is supported. With the improved pre-fetching mechanism, the present invention can efficiently bring into memory any page identified in the traces, including a file page, a private (process heap, kernel pool) page in page-file, registry page, or file system metadata such as MFT (master file table) or directory.

As can be seen from the foregoing, the various proactive memory management mechanisms provide a much improved user experience for new machines with large memories, including mobile devices such as tablets, as well as desktops and laptops, by ensuring that data will almost always be in memory in advance. The methods and mechanism are proactive, deal with global memory management (both in memory and on disk) by obtaining rich information, and manage memory at all levels of use. I/O efficiency is also provided, along with I/O categories, to attempt to optimize I/O transfers while minimizing interference. A more intelligently managed, prioritized standby page set facilitates the maintenance of more valuable pages over less valuable ones, also factoring in the concept of utility estimation. Tracing determines more optimal memory usage, along with contexts, including user-defined, application-defined and system-defined contexts. The comprehensive memory management systems and methods of the present invention thus provides significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage device having stored thereon a data structure, comprising:
   a standby page set for logically storing a plurality of pages of memory that have been identified as candidates for being paged out from system memory to durable storage due to memory pressure; and
   a plurality of subsets in the standby page set, each subset being associated with a different priority value, each subset containing one or more of the pages having the priority value that is associated with the subset,
   wherein the standby page set is rebalanced to move pages between the subsets based on measured usage information for the pages.

2. The computer-readable storage device of claim 1, wherein the standby page set includes at least one frequency-based subset in the standby page set for storing pages according to how often the page has been accessed.

3. The computer-readable storage device of claim 1, wherein the standby page set includes at least one time-of-last-usage-based subset in the standby page set for storing pages according to how recently the page has been accessed.

4. The computer-readable storage device of claim 1, wherein the standby page set includes at least one frequency-based subset in the standby page set for storing pages according to how often the page has been accessed, and at least one time-of-last-usage-based subset in the standby page set for storing pages according to how recently the page has been accessed, the standby page set rebalanced to move pages between the time-of-last-usage based subset and the frequency-based subset based on time data.

5. The computer-readable storage device of claim 1, wherein the standby page set includes a plurality of frequency-based subsets in the standby page set, the standby page set rebalanced to move pages between the frequency-based subsets based on time data.

6. The computer-readable storage device of claim 5, wherein at least one of the frequency-based subsets corresponds to a usage count per time period.

7. The computer-readable storage device of claim 6, wherein at least one other of the frequency-based subsets corresponds to a usage count per another time period.

8. The computer-readable storage device of claim 7, wherein the time periods are not equal in length.

9. The computer-readable storage device of claim 1, wherein the standby page set includes a plurality of time-of-last-usage-based subsets in the standby page set, the standby page set rebalanced to move pages between the time-of-last-usage-based subsets based on time data.

10. The computer-readable storage device of claim 1, wherein at least one of the subsets is present in the standby page set to fill with pages that are pre-fetched from a secondary storage device.

11. The computer-readable storage device of claim 1, wherein at least one of the subsets is present in the standby page set for storing pages that are locked into memory.

12. The computer-readable storage device of claim 1, wherein at least one of the subsets is present in the standby page set stores pages that have no associated score.

13. A computer-readable storage device having stored thereon a data structure, comprising:
a standby page set for logically storing pages of memory;
a plurality of subsets in the standby page set, each subset corresponding to a value associated with the pages therein; and
wherein the standby page set is rebalanced to move pages between the subsets based on measured usage information for the pages, and
wherein the standby page set includes a plurality of frequency-based subsets in the standby page set, the standby page set rebalanced to move pages between the frequency-based subsets based on time data.

14. The computer-readable storage device of claim 13, wherein the standby page set includes at least one time-of-last-usage-based subset in the standby page set for storing pages according to how recently the page has been accessed.

15. The computer-readable storage device of claim 13, wherein at least one of the frequency-based subsets corresponds to a usage count per time period.

16. The computer-readable storage device of claim 15, wherein at least one other of the frequency-based subsets corresponds to a usage count per another time period.

17. The computer-readable storage device of claim 16, wherein the time periods are not equal in length.

18. A computer-readable storage device having stored thereon a data structure, comprising:
a standby page set for logically storing pages of memory;
a plurality of subsets in the standby page set, each subset corresponding to a value associated with the pages therein; and
wherein the standby page set is rebalanced to move pages between the subsets based on measured usage information for the pages, and
wherein the standby page set includes a plurality of time-of-last-usage-based subsets in the standby page set, the standby page set rebalanced to move pages between the time-of-last-usage-based subsets based on time data.

19. The computer-readable storage device of claim 18, wherein the standby page set includes at least one frequency-based subset in the standby page set for storing pages according to how often the page has been accessed.

20. The computer-readable storage device of claim 18, wherein the standby page set includes at least one frequency-based subset in the standby page set for storing pages according to how often the page has been accessed, and at least one time-of-last-usage-based subset in the standby page set for storing pages according to how recently the page has been accessed, the standby page set rebalanced to move pages between the time-of-last-usage based subset and the frequency-based subset based on time data.

* * * * *